US012632658B2

(12) United States Patent
Pouran Ben Veyseh et al.

(10) Patent No.: US 12,632,658 B2
(45) Date of Patent: May 19, 2026

(54) SYSTEM AND METHODS FOR KEY-PHRASE EXTRACTION

(71) Applicant: ADOBE INC., San Jose, CA (US)

(72) Inventors: Amir Pouran Ben Veyseh, Eugene, OR (US); Franck Dernoncourt, San Jose, CA (US); Walter W. Chang, San Jose, CA (US); Trung Huu Bui, San Jose, CA (US); Hanieh Deilamsalehy, Seattle, WA (US); Seunghyun Yoon, San Jose, CA (US); Rajiv Bhawanji Jain, Falls Church, VA (US); Quan Hung Tran, San Jose, CA (US); Varun Manjunatha, Newton, MA (US)

(73) Assignee: ADOBE INC., San Jose, CA (US)

( * ) Notice: Subject to any disclaimer, the term of this patent is extended or adjusted under 35 U.S.C. 154(b) by 443 days.

(21) Appl. No.: 17/650,876

(22) Filed: Feb. 14, 2022

(65) Prior Publication Data

US 2023/0259708 A1 Aug. 17, 2023

(51) Int. Cl.
| | |
|---|---|
| *G06F 40/289* | (2020.01) |
| *G06F 40/30* | (2020.01) |
| *G10L 15/06* | (2013.01) |
| *G10L 15/16* | (2006.01) |
| *G10L 15/22* | (2006.01) |

(52) U.S. Cl.
CPC ............ *G06F 40/289* (2020.01); *G06F 40/30* (2020.01); *G10L 15/063* (2013.01); *G10L 15/16* (2013.01); *G10L 15/22* (2013.01); *G10L 2015/0635* (2013.01)

(58) Field of Classification Search
CPC ..... G06F 40/289; G06F 40/30; G10L 15/063; G10L 15/16; G10L 15/22; G10L 2015/0635
See application file for complete search history.

(56) References Cited

U.S. PATENT DOCUMENTS

| | | | | |
|---|---|---|---|---|
| 2020/0320086 A1* | 10/2020 | Liu | ........................ | G06F 16/367 |
| 2021/0109959 A1* | 4/2021 | Boni | ..................... | G06F 18/211 |
| 2021/0151038 A1* | 5/2021 | Manjunath | .......... | G10L 15/1815 |

FOREIGN PATENT DOCUMENTS

| | | | | |
|---|---|---|---|---|
| WO | WO-2021002999 A1 * | 1/2021 | ........... | G06F 40/258 |

OTHER PUBLICATIONS

Narayan et al. ("Ranking Sentences for Extractive Summarization with Reinforcement Learning") (Year: 2018).*

(Continued)

*Primary Examiner* — Hai Phan
*Assistant Examiner* — Alvin Iskender
(74) *Attorney, Agent, or Firm* — F. CHAU & ASSOCIATES, LLC

(57) ABSTRACT

Systems and methods for key-phrase extraction are described. The systems and methods include receiving a transcript including a text paragraph and generating key-phrase data for the text paragraph using a key-phrase extraction network. The key-phrase extraction network is trained to identify domain-relevant key-phrase data based on domain data obtained using a domain discriminator network. The systems and methods further include generating metadata for the transcript based on the key-phrase data.

15 Claims, 8 Drawing Sheets

(56)             References Cited

OTHER PUBLICATIONS

Rioux et al. "Fear the Reaper: A System for Automatic Multi-Document Summarization with Reinforcement Learning" (Year: 2014).*

Wang et al. "Exploiting Topic-Based Adversarial Neural Network for Cross-Domain Keyphrase Extraction", 2018 (Year: 2018).*

Yasui et al. "Using Semantic Similarity as Reward for Reinforcement Learning in Sentence Generation" (Year: 2019).*

1Devlin, et al., "BERT: Pre-training of Deep Bidirectional Transformers for Language Understanding", arXiv preprint arXiv:1810.04805v2 [cs.CL] May 24, 2019, 16 pages.

2Sun, et al., "Capturing Global Informativeness in Open Domain Keyphrase Extraction", arXiv preprint arXiv:2004.13639v2 [cs.CL] Sep. 17, 2021, 12 pages.

3Xiong, et al., "Open Domain Web Keyphrase Extraction Beyond Language Modeling", arXiv preprint arXiv:1911.02671v1 [cs.CL] Nov. 6, 2019, 10 pages.

* cited by examiner

Receive audio data 205

Transcribe the audio data 210

Generate key phrase data from the transcript 215

Provide the key phrase data and the audio data 220

Receive a transcript including a text paragraph    505

Generate key-phrase data for the text paragraph using a key-phrase extraction network    510

Generate metadata for the transcript based on the key-phrase data    515

Encode each word of the text paragraph using a text encoder to obtain hidden word representations for the text paragraph ⟍605

Generate key-phrase data based on the hidden word representations ⟍610

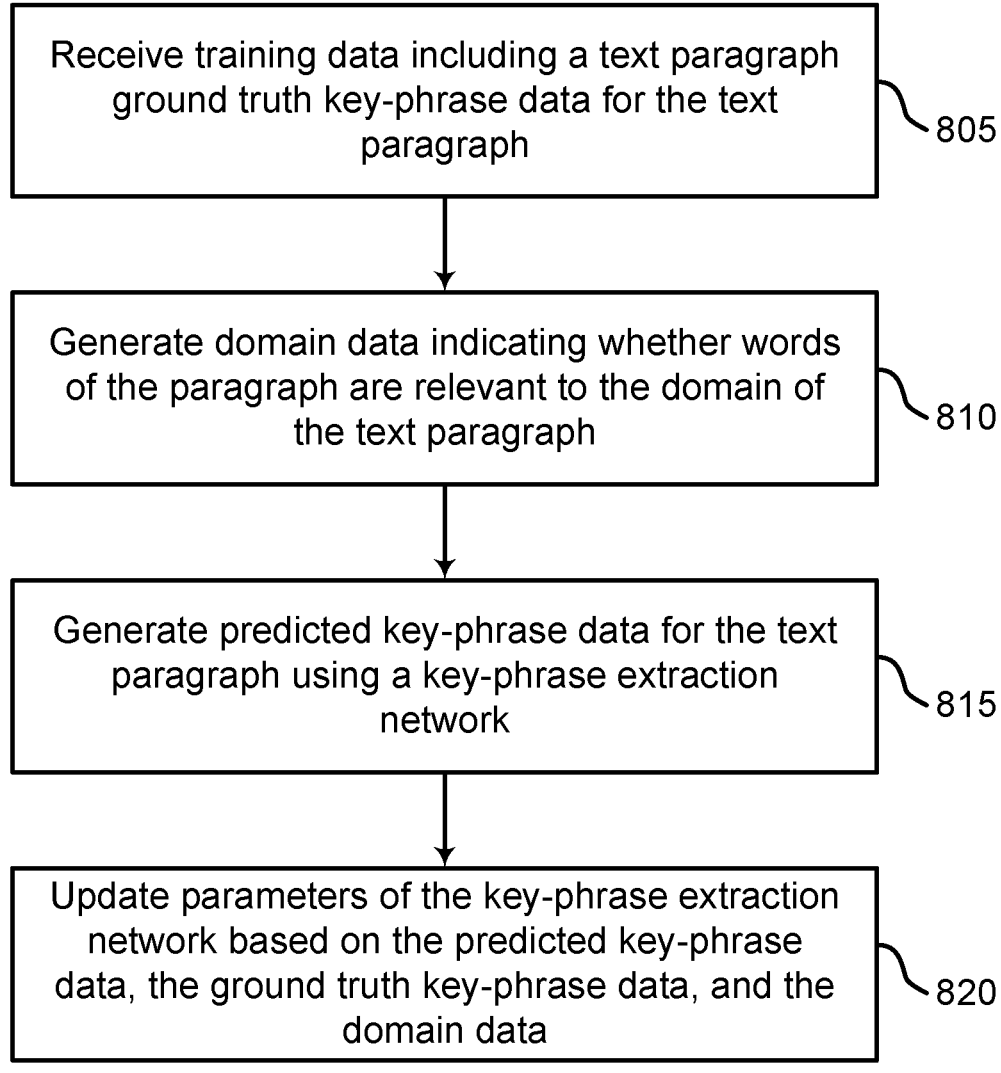

Receive training data including a text paragraph ground truth key-phrase data for the text paragraph

805

Generate domain data indicating whether words of the paragraph are relevant to the domain of the text paragraph

810

Generate predicted key-phrase data for the text paragraph using a key-phrase extraction network

815

Update parameters of the key-phrase extraction network based on the predicted key-phrase data, the ground truth key-phrase data, and the domain data

SYSTEM AND METHODS FOR KEY-PHRASE EXTRACTION

BACKGROUND

The following relates generally to natural language processing, and more specifically to key-phrase extraction.

Natural language processing (NLP) refers to techniques for using computers to interpret or generate natural language. In some cases, NLP tasks involve assigning annotation data such as grammatical information to words or phrases within a natural language expression. Different classes of machine-learning algorithms have been applied to NLP tasks. Some algorithms, such as decision trees, utilize hard if-then rules. Other systems use neural networks or statistical models which make soft, probabilistic decisions based on attaching real-valued weights to input features. These models may express the relative probability of multiple answers.

NLP techniques may be applied in a key-phrase extraction context, for example in techniques for extracting key phrases from text transcripts. Text transcripts of audio data are beneficial for many purposes in which a text representation of the contents of the audio is preferable to the audio itself. One such benefit is summarization, in which important ideas expressed in the audio data are represented by key-phrases that are extracted from the transcript. Another benefit is increased searchability of the contents of the audio data, which may be augmented by an association between extracted key-phrases and metadata such as time information.

Careful, manual transcription of pre-recorded audio data is labor-intensive, time-consuming, and time-insensitive, and so audio data may instead be transcribed in real time, either automatically or manually. Manual key-phrase extraction from text documents is also labor-intensive, and so machine learning systems may perform automatic key-phrase extraction as a natural language processing technique.

However, existing machine-learning systems are typically trained on documents that are edited and grammatically correct and therefore do not efficiently and accurately extract key-phrases from live transcriptions of audio, as live transcripts are "noisy" (i.e., they include "chitchat" and repeated sentences/words). Furthermore, existing machine learning key-phrase extraction systems do not ensure a uniqueness of key-phrases in a paragraph of a document, and therefore may extract redundant key-phrases for multiple paragraphs. Finally, existing machine learning key-phrase extraction systems are trained in scientific or weblog domains, and therefore do not benefit from a knowledge of characteristics that are associated with the live-transcript domain.

SUMMARY

A method is described. One or more aspects of the method include receiving a transcript including a text paragraph; generating key-phrase data for the text paragraph using a key-phrase extraction network, wherein the key-phrase extraction network is trained to identify domain-relevant key-phrase data based on domain data obtained using a domain discriminator network; and generating meta-data for the transcript based on the key-phrase data.

A method is described. One or more aspects of the method include receiving training data including a text paragraph ground truth key-phrase data for the text paragraph; generating domain data indicating whether words of the paragraph are relevant to the domain of the text paragraph; generating predicted key-phrase data for the text paragraph using a key-phrase extraction network; and updating parameters of the key-phrase extraction network based on the predicted key-phrase data, the ground truth key-phrase data, and the domain data.

An apparatus and a system are described. One or more aspects of the apparatus and system include a text encoder configured to encode words of a text paragraph to obtain hidden word representations for the text paragraph and a key-phrase extraction network configured to generate key-phrase data for the text paragraph based on the hidden word representations, wherein the key-phrase extraction network is trained to identify domain-relevant key-phrase data based on domain data for the text paragraph.

BRIEF DESCRIPTION OF THE DRAWINGS

FIG. 8 shows an example of a process for training a neural network according to aspects of the present disclosure.

DETAILED DESCRIPTION

Figure 1:
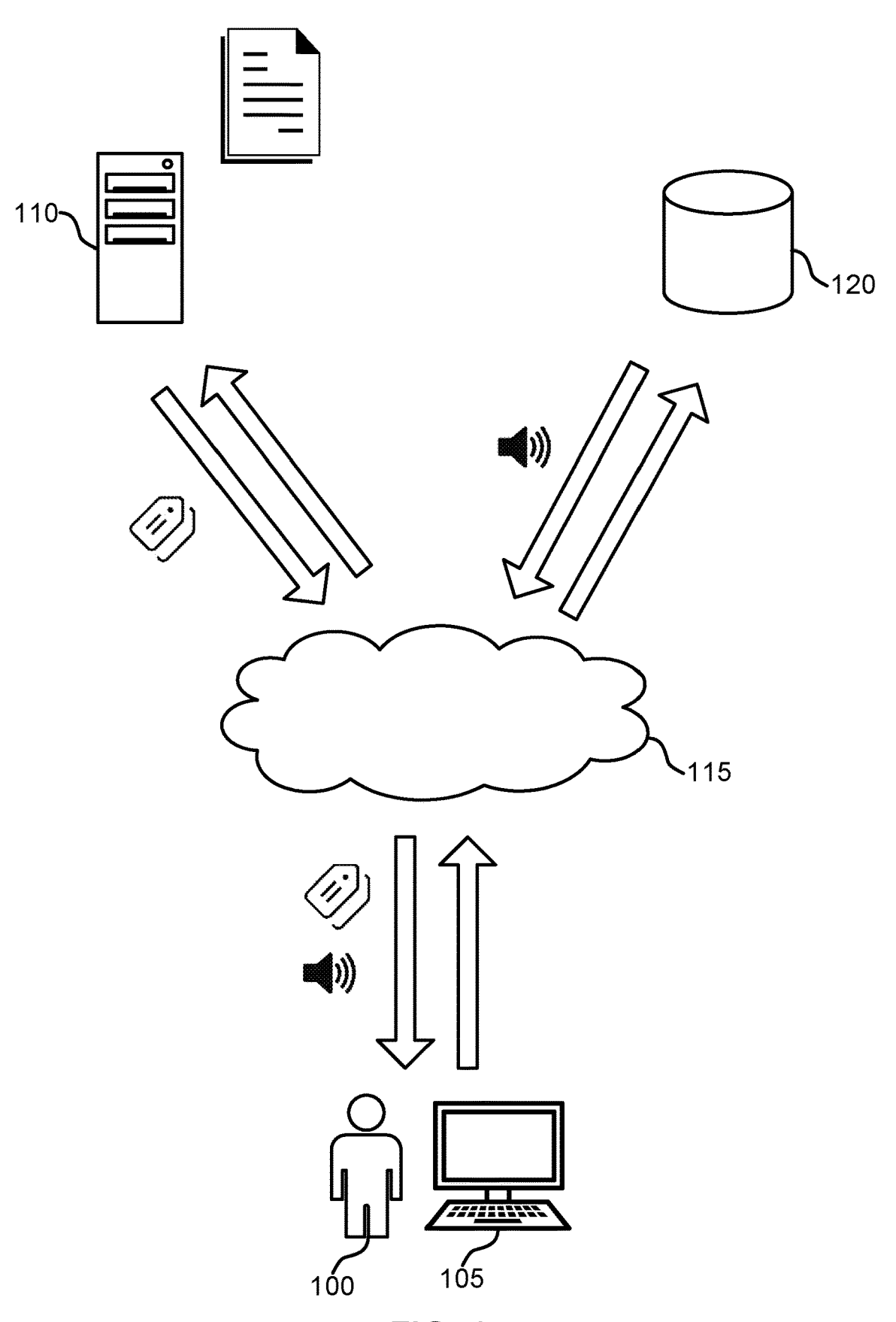
FIG. 1 shows an example of a natural language processing system according to aspects of the present disclosure.

The present disclosure describes systems and methods for key-phrase extraction that may receive a transcript that includes a text paragraph, generate a key phrase for the text paragraph, and generate meta-data for the transcript based on the key-phrase data. In some examples, the systems and methods for key-phrase extraction may train a deep learning-based key-phrase extraction network to identify domain-relevant key-phrase data based on domain data obtained using a deep learning-based domain discriminator network.

Key-phrase extraction is an example of an NLP technique. Key-phrase extraction may be applied as a machine learning technique to extract phrases from a text document that are associated with important ideas in the document. These key-phrases are beneficial for many purposes, including summarization and easing searchability of the document.

However, current machine learning-based key-phrase extraction systems are not well-suited to extracting key-phrases and generating key-phrase data from a textual transcript of audio. For example, these existing systems have not been trained on noisy transcripts that include repeated words and "chit-chat", but rather on documents that include edited, grammatically correct sentences. Furthermore, these existing systems do not ensure a uniqueness of key-phrases in a paragraph of a document, and therefore may extract redundant key-phrases from multiple paragraphs. Finally, these existing systems are trained in scientific or weblog domains, and therefore do not benefit from a knowledge of characteristics that are associated with the transcript domain.

To better accomplish key-phrase extraction from a transcript, an embodiment of the present disclosure includes a technologically advantageous, deep-learning based key-phrase extraction network that is trained to identify domain-relevant key-phrase data based on domain data obtained using a technologically advantageous, deep-learning based domain discriminator network. An embodiment of the present disclosure may receive a transcript that includes a text paragraph, generate key-phrase data for the text paragraph using the key-phrase extraction network, and generate meta-data for the transcript based on the key-phrase data.

Accordingly, embodiments of the present disclosure may discriminate domain data that is obtained from one domain (e.g., a transcript) versus another (e.g., a scientific article), learn from the domain data, and generate and provide key-phrase data and associated meta-data as a result of that learning, and thereby provide effective key-phrase extraction on a transcript of audio data.

Embodiments of the present disclosure may be used in a transcription context. For example, a machine learning apparatus according to the present disclosure may receive audio data, transcribe the audio data, generate key-phrase data based on the generated transcript, and provide the key-phrase data, the transcript, the audio data, and/or associated meta-data to a user. An example application of the inventive concept in the transcription context is provided with reference to FIGS. 1-2. Details regarding the architecture of an example machine learning apparatus are provided with reference to FIG. 3-4. Examples of a process for natural language processing are provided with reference to FIGS. 5-6. Examples of training a machine learning model are provided with reference to FIGS. 7-8.

Natural Language Processing System

FIG. 1 shows an example of a natural language processing system according to aspects of the present disclosure. The example shown includes user 100, user device 105, machine learning apparatus 110, cloud 115, and database 120.

Referring to FIG. 1, machine learning apparatus 110 may be used to generate a transcript of audio data received from database 120 via cloud 115, generate key-phrase data based on the transcript, and provide the audio data and the key-phrase data to one or more users 100. One or more users 100 communicates with machine learning apparatus 110 via one or more user devices 105 and cloud 115. A user device 105 may be a personal computer, laptop computer, mainframe computer, palmtop computer, personal assistant, mobile device, or any other suitable processing apparatus. One or more users 100 may interact with user device 105 via a user interface and an input component. An input device may be a computer mouse, keyboard, keypad, trackball, and/or voice recognition device. An input component may include any combination of devices that allow users to input information into a computing device, such as buttons, a keyboard, switches, and/or dials. In addition, the input component may include a touch-screen digitizer overlaid onto the display that may sense touch and interact with the display. A user interface enables a user to interact with user device 105.

The user device 105 may be a personal computer, laptop computer, mainframe computer, palmtop computer, personal assistant, mobile device, or any other suitable processing apparatus. In some examples, the user device 105 includes software that may communicate requests, messages, and data with machine learning apparatus 110 and database 120 via cloud 115.

Machine learning apparatus 110 may include a computer implemented network that includes one or more neural networks. Machine learning apparatus 110 may also include one or more processors, a memory subsystem, a communication interface, an I/O interface, one or more user interface components, and a bus. Additionally, machine learning apparatus 110 may communicate with user device 105 and database 120 via cloud 115.

In some cases, machine learning apparatus 110 is implemented on a server. A server provides one or more functions to users 100 linked by way of one or more of the various networks. In some cases, the server includes a single microprocessor board, which includes a microprocessor responsible for controlling all aspects of the server. In some cases, a server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

Machine learning apparatus 110 may be used, for example, in a real-time transcription context. For example, a user may want to know key phrases of a real-time transcription of audio data so that important ideas expressed in the audio may be quickly summarized and/or timed. Conventional key-phrase extraction systems are not able to properly find key-phrases in real-time transcripts due to the presence of noise (such as repeated words, chit-chat, false sentence starts, stumbled speech, etc.) and inadequate training of neural networks used in the process (for example, the neural networks used in conventional key-phrase extraction systems are trained on documents that include edited, grammatically correct sentences, and not real-time transcripts). In contrast, machine learning apparatus 110 is able to receive audio data, generate a transcript of the audio in real time, extract key phrases from the transcript using one or more neural networks that have been trained in a real-time transcription domain, and provide the key phrases, transcript, audio data, and/or associated meta-data to the user.

Figure 3:
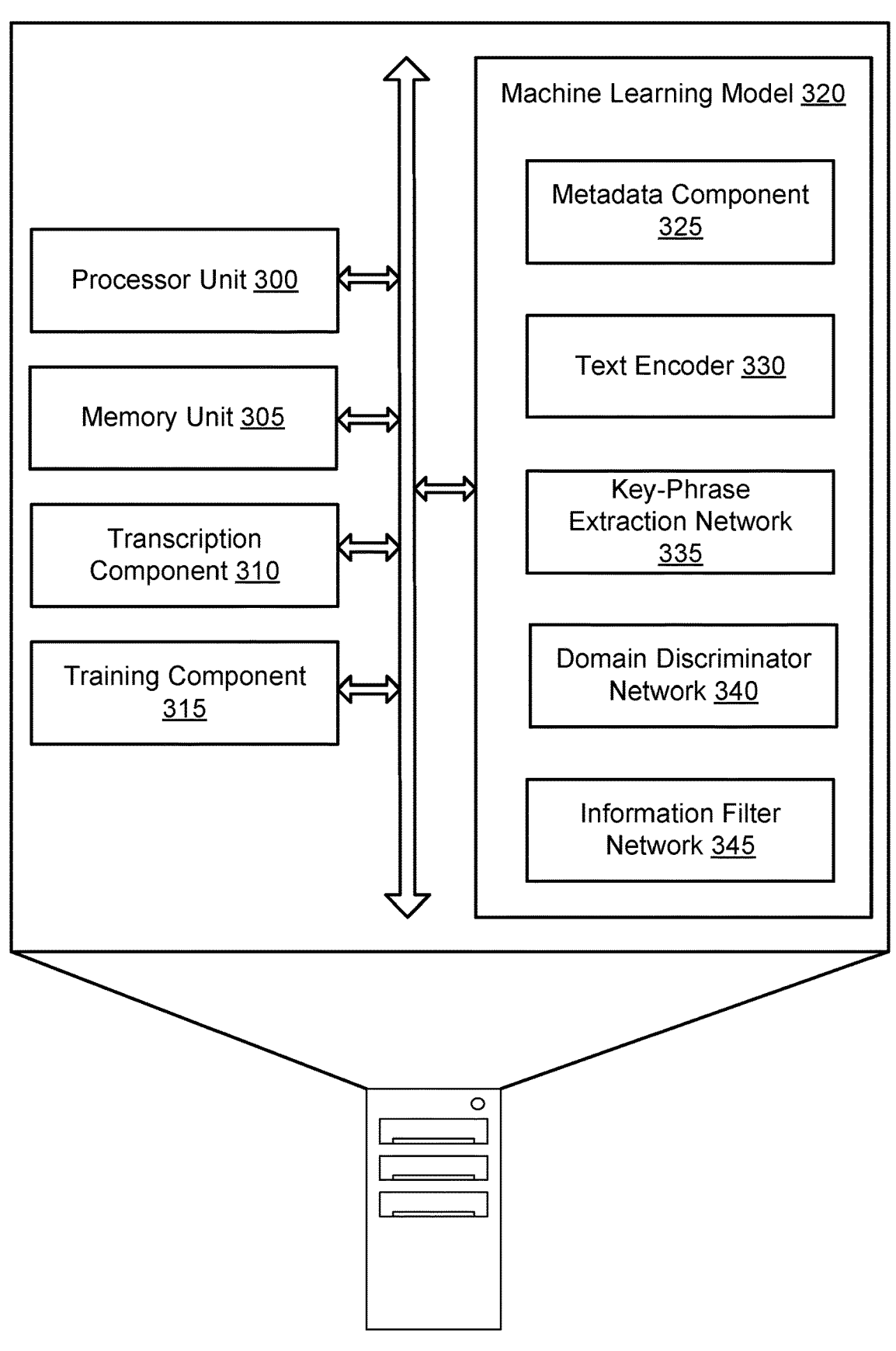
FIG. 3 shows an example of a machine learning apparatus according to aspects of the present disclosure.
Figure 4:
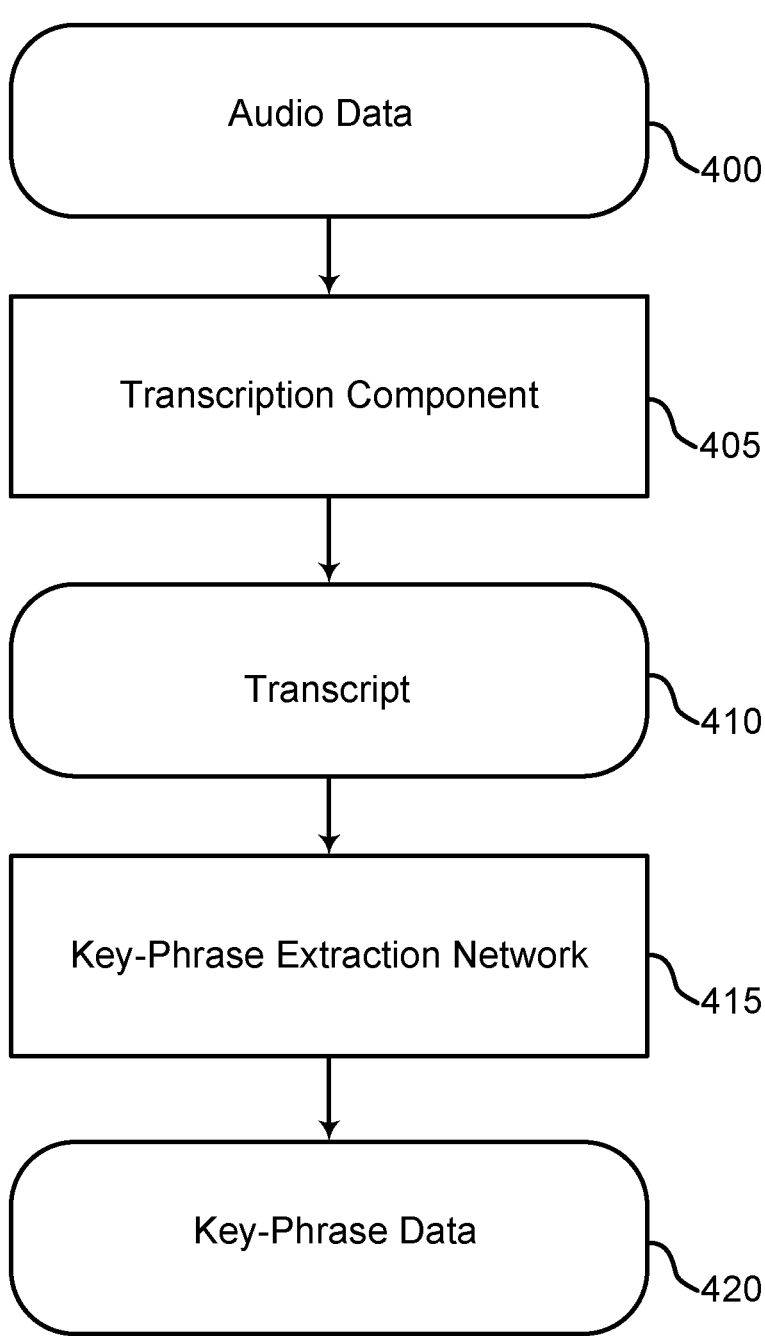
FIG. 4 shows an example of a process for key-phrase data extraction according to aspects of the present disclosure.

Further detail regarding the architecture of machine learning apparatus 110 is provided with reference to FIG. 3-4. Further detail regarding natural language processing is provided with reference to FIGS. 5-6. Further detail regarding a process for training a machine learning is provided with reference to FIGS. 7-8.

A cloud such as cloud 115 is a computer network configured to provide on-demand availability of computer system resources, such as data storage and computing power. In some examples, cloud 115 provides resources without active management by the user 100. The term cloud is sometimes used to describe data centers available to many users over the Internet. Some large cloud networks have functions distributed over multiple locations from central servers. A server is designated an edge server if it has a direct or close connection to a user 100. In some cases, a cloud is limited to a single organization. In other examples, the cloud is available to many organizations. In one example, cloud 115 includes a multi-layer communications network comprising multiple edge routers and core routers. In another example, cloud 115 is based on a local collection of switches in a single physical location.

A database such as database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with the database controller. In other cases, the database controller may operate automatically without user interaction.

Figure 2:
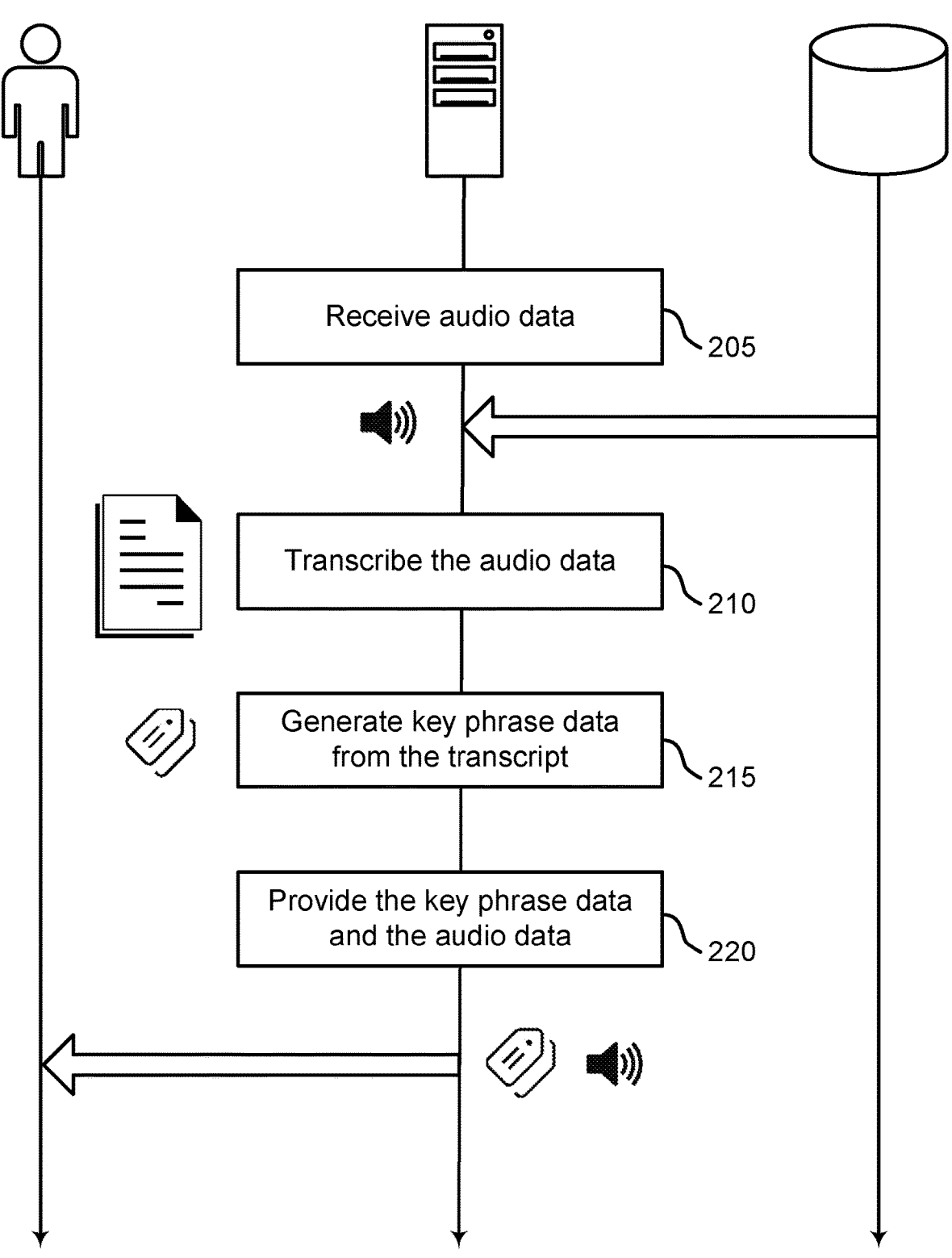
FIG. 2 shows an example of natural language processing according to aspects of the present disclosure.

FIG. 2 shows an example of natural language processing according to aspects of the present disclosure. Referring to FIG. 2, a machine learning apparatus according to the present disclosure may receive audio data, transcribe the audio data, generate key-phrase data based on the generated transcript, and provide the key-phrase data and the audio data to a user.

At operation 205, the system receives audio data. In some cases, the operations of this step refer to, or may be performed by, a machine learning apparatus as described with reference to FIG. 1. For example, in some cases, the machine learning apparatus may receive audio data from a database as described with reference to FIG. 2. Further details regarding this operation are provided with reference to FIG. 4.

At operation 210, the system transcribes the audio data. In some cases, the operations of this step refer to, or may be performed by, a machine learning apparatus as described with reference to FIG. 1. For example, the machine learning apparatus may generate a transcript of the audio data using a transcription component of the machine learning apparatus. Further details regarding this operation are provided with reference to FIG. 4.

At operation 215, the system generates key-phrase data from the transcript. In some cases, the operations of this step refer to, or may be performed by, a machine learning apparatus as described with reference to FIG. 1. For example, the machine learning apparatus may generate the key-phrase data using a key-phrase extraction network of the machine learning apparatus. Further details regarding this operation are provided with reference to FIGS. 4-6.

At operation 220, the system provides the key-phrase data and the audio data to a user. In some cases, the operations of this step refer to, or may be performed by, a machine learning apparatus as described with reference to FIG. 1. For example, the machine learning apparatus may transmit the key-phrase data and the audio data via a communication component of the machine learning apparatus to a user via a user device and a cloud as described with reference to FIG. 1.

System Architecture

An apparatus for natural language processing is described. One or more aspects of the apparatus include a text encoder configured to encode words of a text paragraph to obtain hidden word representations for the text paragraph and a key-phrase extraction network configured to generate key-phrase data for the text paragraph based on the hidden word representations. The key-phrase extraction network may be trained to identify domain-relevant key-phrase data based on domain data for the text paragraph.

Some examples of the apparatus further include a domain discriminator network configured to generate the domain data for the text paragraph. Some examples of the apparatus further include a transcription component configured to transcribe audio data to obtain the text paragraph. In some aspects, the text encoder comprises a neural network with a transformer architecture. In some aspects, the key-phrase extraction network comprises a neural network having a feed-forward architecture.

FIG. 3 shows an example of a machine learning apparatus according to aspects of the present disclosure. The example shown includes processor unit 300, memory unit 305, transcription component 310, training component 315, and machine learning model 320.

Processor unit 300 includes one or more processors. A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 300 is configured to operate a memory array using a memory controller. In other cases, a memory controller is integrated into processor unit 300. In some cases, processor unit 300 is configured to execute computer-readable instructions stored in memory unit 305 to perform various functions. In some embodiments, processor unit 300 includes special purpose components for modem processing, baseband processing, digital signal processing, or transmission processing.

Memory unit 305 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor of processor unit 300 to perform various functions described herein. In some cases, memory unit 305 contains, among other things, a basic input/output system (BIOS) which controls basic hardware or software operation such as the interaction with peripheral components or devices. In some cases, memory unit 305 includes a memory controller that operates memory cells of memory unit 305. For example, the memory controller may include a row decoder, column decoder, or both. In some cases, memory cells within memory unit 305 store information in the form of a logical state.

According to some aspects, transcription component 310 receives audio data. In some examples, transcription component 310 converts the audio data to text to obtain the transcript. According to some aspects, transcription component 310 is configured to transcribe audio data to obtain the text paragraph. Transcription component 310 is an example of, or includes aspects of, the corresponding element described with reference to FIG. 4.

Machine learning model 320 may include one or more artificial neural networks (ANNs). An ANN is a hardware or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the neural network. Hidden representations are machine-readable data representations of an input that are learned from a neural network's hidden layers and are produced by the output layer. As the neural network's understanding of the input improves during a training process, the hidden representations generated in later iterations are progressively differentiated from those in earlier iterations.

During a training process of an ANN, the node weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

The term "loss function" refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly and a new set of predictions are made during the next iteration.

In one aspect, machine learning model 320 includes meta-data component 325, text encoder 330, key-phrase extraction network 335, domain discriminator network 340, and information filter network 345. Each of meta-data component 325, text encoder 330, key-phrase extraction network 335, domain discriminator network 340, and information filter network 345 may include one or more ANNs.

According to some aspects, meta-data component 325 receives a transcript including a text paragraph. In some examples, meta-data component 325 generates meta-data for the transcript based on the key-phrase data. In some examples, meta-data component 325 generates an indication that a time is associated with the key-phrase data.

According to some aspects, text encoder 330 is configured to encode words of a text paragraph to obtain hidden word representations for the text paragraph. According to some aspects, the text encoder 330 includes a neural network with a transformer architecture. Transformer architecture is a deep learning model that may be used in natural language processing applications and that operates according to an attention mechanism. An attention mechanism is a method of placing differing levels of importance on different elements of an input. Calculating attention scores may be a three-step process of computing the similarity between a query and key vectors obtained from an input to generate attention weights, using a softmax function to normalize the attention weights, and weighing the attention weights together with the corresponding values. A softmax function is used as the activation function of a neural network to normalize the output of the network to a probability distribution over predicted output classes. After applying the softmax function, each component of the feature map is in the interval (0, 1) and the components add up to one. These values are interpreted as probabilities.

For example, in some embodiments, text encoder 330 may be implemented as a $BERT_{BASE}$ model. A $BERT_{BASE}$ model may include 12 pre-trained encoders with 12 bi-directional self-attention heads to learn contextual embeddings for words and which may be fine-tuned after pre-training.

According to some aspects, key-phrase extraction network 335 is configured to generate key-phrase data for the text paragraph based on the hidden word representations, wherein the key-phrase extraction network 335 is trained to identify domain-relevant key-phrase data based on domain data for the text paragraph obtained using a domain discriminator network 340. For example, key-phrase extraction network 335 may select a given word w as a key-phrase kp if a likelihood that the word is a key-phrase is above a predetermined threshold.

In some aspects, the key-phrase extraction network 335 is trained to select informative key-phrase words. According to some aspects, key-phrase extraction network 335 generates predicted key-phrase data. In some examples, key-phrase extraction network 335 generates the predicted key-phrase data for the text paragraph based on the hidden word representations. In some aspects, the key-phrase extraction network 335 includes a neural network having a feed-forward architecture. "Feed-forward" refers to an element or pathway in an ANN in which connections between nodes of the ANN do not form a cycle. Information provided to a feed-forward ANN moves in one direction from an input layer, to hidden layers, and then to an output layer.

In some examples, key-phrase extraction network 335 identifies a key-phrase associated with a time of the audio data. For example, meta-data component 325 may provide time data associated with a transcript and audio data to key-phrase extraction network 335, and key-phrase extraction network 335 may identify a key-phrase associated with the time data. Key-phrase extraction network 335 is an example of, or includes aspects of, the corresponding element described with reference to FIG. 4.

According to some aspects, domain discriminator network 340 generates domain data indicating whether words of a text paragraph are relevant to a domain of the text paragraph. Manually annotated resources in a domain other than a transcript domain (such as OpenKP, which provides annotated web page domain key-phrase extraction resources) may increase performance of key-phrase extraction network 335. However, a domain shift between two domains might hinder the training of a given machine learning model. For example, a model trained on a web page domain might pay more attention to noise in a transcript and ignore an informative portion of a transcript that contains more technical phrases. Accordingly, training component 315 may train components of machine learning model 320 in a multi-task setting using data obtained from domain discriminator network 340 to recognize phrases that are representative of an intended domain (e.g., a transcript domain).

In some examples, domain discriminator network 340 computes paragraph-specific domain data for each of a set of text paragraphs in a document, where the parameters of the key-phrase extraction network 335 are updated based on the paragraph-specific domain data. In some examples, domain discriminator network 340 generates domain data based on the hidden word representations.

According to some aspects, information filter network 345 determines whether a word of the text paragraph is a repeated word. In some examples, information filter network 345 computes a semantic similarity score for each sentence in the paragraph. In some examples, information filter network 345 determines whether each of the sentences is an informative sentence based on the semantic similarity score.

For example, portions of a transcript of audio data might diverge from important content of the audio data. These portions of the transcripts (e.g., chit-chat) are uninformative. Accordingly, training component 315 may update parameters of key-phrase extraction network 335 using data from information filter network 345 to avoid extracting key-phrase data from uninformative portions of transcripts.

According to some aspects, training component 315 may participate in a training process of the one or more ANNs of machine learning model 320. For example, according to some aspects, training component 315 receives training data including a text paragraph ground truth key-phrase data for the text paragraph. In some examples, training component 315 updates parameters of the key-phrase extraction network 335 based on the predicted key-phrase data, the ground truth key-phrase data, and the domain data.

In some examples, training component 315 compares the predicted key-phrase data and the ground truth key-phrase data. In some examples, training component 315 computes a key-phrase loss based on the comparison, where the parameters of the key-phrase extraction network 335 are updated based on the key-phrase loss. In some examples, training component 315 computes a uniqueness reward based on whether the word is the repeated word, where the parameters of the key-phrase extraction network 335 are updated based on the uniqueness reward. In some examples, training component 315 computes an informativeness reward based on the determination of information filter network 345 whether each sentence is an informative sentence based on the semantic similarity score, where the parameters of the key-phrase extraction network 335 are updated based on the informativeness reward.

FIG. 4 shows an example of a process for key-phrase data extraction according to aspects of the present disclosure. The example shown includes audio data 400, transcription component 405, transcript 410, key-phrase extraction network 415, and key-phrase data 420. Transcription component 405 is an example of, or includes aspects of, the corresponding element described with reference to FIG. 3. Key-phrase extraction network 415 is an example of, or includes aspects of, the corresponding element described with reference to FIG. 3.

Referring to FIG. 4, transcription component 405 may receive audio data 400 as an input. In some embodiments, audio data 400 may be provided from a database as described with reference to FIG. 1. Transcription component 405 may transcribe audio data 400 to generate transcript 410.

Key-phrase extraction network 415 may be provided with transcript 410 and may extract key-phrases from transcript 410 to produce key-phrase data 420. For example, key-phrase extraction network may extract key-phrase data 420 from transcript 410 based on a likelihood that a given word is a key-phrase.

Key-Phrase Extraction

A method for natural language processing is described. One or more aspects of the method include receiving a transcript including a text paragraph; generating key-phrase data (e.g., key-phrases) for the text paragraph using a key-phrase extraction network, wherein the key-phrase extraction network is trained to identify domain-relevant key-phrase data based on domain data obtained using a domain discriminator network; and generating meta-data for the transcript based on the key-phrase data.

Some examples of the method further include receiving audio data. Some examples further include converting the audio data to text to obtain the transcript. Some examples of the method further include identifying a key-phrase associated with a time of the audio data. Some examples further include generating an indication that a time is associated with the key-phrase data. Some examples of the method further include encoding each word of the text paragraph using a text encoder to obtain hidden word representations for the text paragraph, wherein the key-phrase data is generated based on the hidden word representations.

In some aspects, the key-phrase extraction network is trained to avoid repeated key-phrase words. In some aspects, the key-phrase extraction network is trained to select key-phrase words that are relevant to the domain of the text paragraph. In some aspects, the key-phrase extraction network is trained to select informative key-phrase words.

Figure 5:
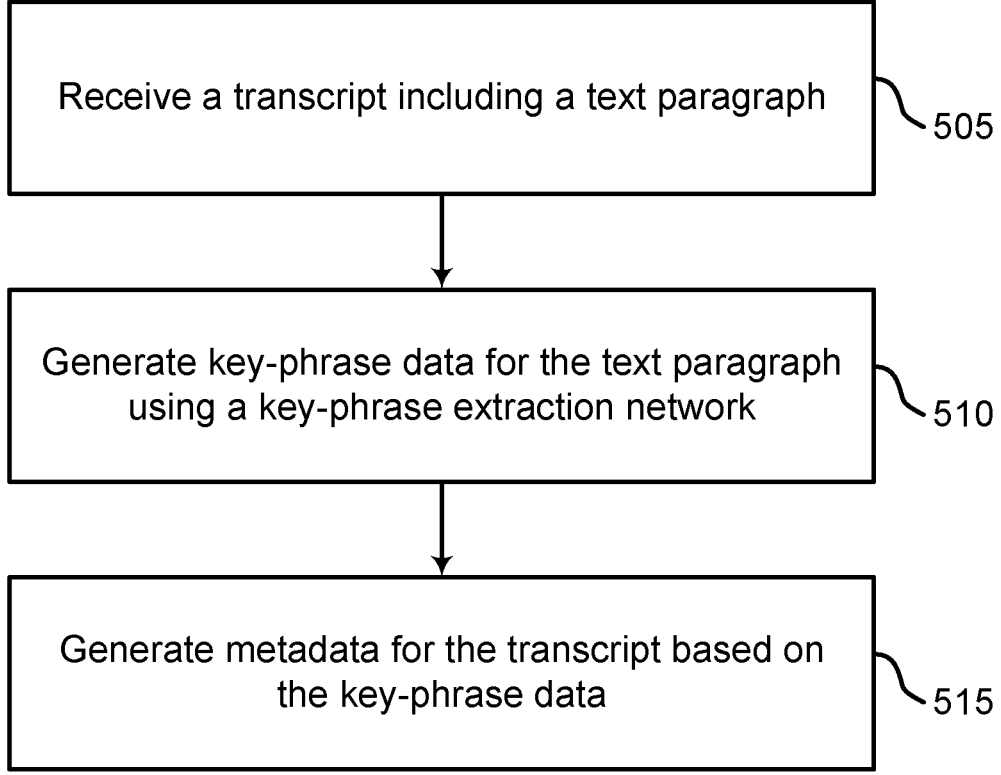
FIG. 5 shows an example of a process for natural language processing according to aspects of the present disclosure.

FIG. 5 shows an example of a process for natural language processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various sub-steps, or are performed in conjunction with other operations.

Referring to FIG. 5, a user may want to be provided with key-phrase data and meta-data that represent important ideas of a transcript. A machine learning apparatus according to the present disclosure may use a deep-learning based machine learning model to extract key-phrase data from a transcript of the audio data that represents important or salient information expressed in the audio data and avoids uninformative data. The machine learning apparatus may also generate meta-data for the transcript (such as time information) based on the key-phrase data.

At operation 505, the system receives a transcript including a text paragraph. In some cases, the operations of this step refer to, or may be performed by, a meta-data component as described with reference to FIG. 3. For example, the meta-data component may receive the transcript from a transcription component according to embodiments of the present disclosure. The transcription component may produce a real-time transcript of audio data. In some embodiments, the audio data may be retrieved from a database according to embodiments of the present disclosure. In some embodiments, the meta-data component may retrieve the transcript from the database.

At operation 510, the system generates key-phrase data for the text paragraph using a key-phrase extraction network, where the key-phrase extraction network is trained to identify domain-relevant key-phrase data based on domain data obtained using a domain discriminator network. In some cases, the operations of this step refer to, or may be performed by, a key-phrase extraction network as described with reference to FIGS. 3 and 4.

For example, the key-phrase extraction network may be trained as described with reference to FIGS. 3 and 7-8. In some embodiments, a training component as described with reference to FIG. 3 based on a key-phrase extraction loss (a cross-entropy loss between generated key-phrase data and ground truth key-phrase data), a bridge loss (a negative log-likelihood loss based on domain-specific key-phrase detection), a uniqueness reward based on whether a word is repeatedly chosen from multiple paragraphs as a key-phrase, and/or an informativeness reward based on whether a sentence is informative or uninformative (e.g., "chit-chat").

Furthermore, the key-phrase extraction network may generate key-phrase data as described with reference to FIG. 6. In some embodiments, the key-phrase extraction network may generate key-phrase data using one or more neural networks that have been trained based on information generated by a text encoder, the key-phrase extraction network, the domain discriminator network, and/or the information filter network as described with reference to FIG. 3. In some embodiments, the key-phrase extraction network may generate key-phrase data using hidden representations of the text paragraph provided by the text encoder.

At operation 515, the system generates meta-data for the transcript based on the key-phrase data. In some cases, the operations of this step refer to, or may be performed by, a meta-data component according to embodiments of the present disclosure. For example, the meta-data component may identify a time associated with each key-phrase in the transcript via time stamps included in the transcript. The meta-data component may then generate meta-data including the identified time information and provide the meta-data to a network via a cloud according to embodiments of the present disclosure.

Figure 6:
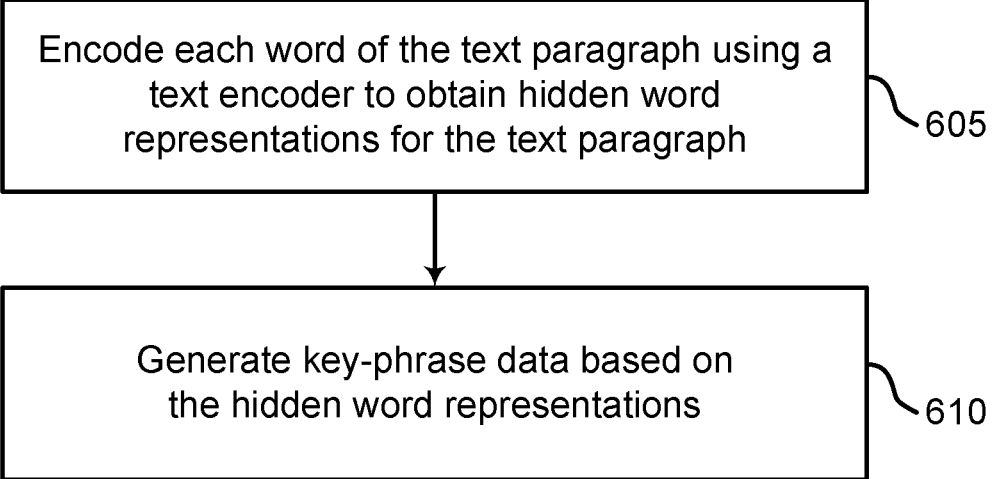
FIG. 6 shows an example of a process for key-phrase data generation according to aspects of the present disclosure.

FIG. 6 shows an example of key-phrase data generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various sub-steps, or are performed in conjunction with other operations.

At operation 605, the system encodes each word of the text paragraph using a text encoder to obtain hidden word representations for the text paragraph. In some cases, the operations of this step refer to, or may be performed by, a text encoder as described with reference to FIG. 3. For example, an input to the text encoder may be a paragraph of a transcript, i.e., $D=[w_1, w_2, \ldots, w_n]$, including n words w. So that a key-phrase extraction network as described with reference to FIG. 3 may select phrases P in a paragraph D that represent the main content of the paragraph D, where a phrase P might be a single word or a span in D, and all noun, verb, or adjective phrases are eligible to be selected as a phrase P, the text encoder may encode the phrases P in a label sequence $$L^P = [l_1^p, l_2^p, \ldots, l_n^p],$$

where $$l_i^p \in \{O, B, I\},$$

B indicates word $w_i$ is the beginning of a phrase, and I indicates the word $w_i$ is the continuation of a phrase. In some embodiments, the text encoder may encode the input paragraph D to high-dimensional hidden representation vectors $H=[h_1, h_2, \ldots, h_n]$ using a pre-trained encoding model, such as BERT (Bidirectional Encoder Representations from Transformers). BERT is a transformer-based technique. It includes a variable number of encoder layers and self-attention heads. It may include a pre-trained transformer encoder to represent tokenized information based on its bidirectional context. In some cases, it encodes context bidirectionally and can be used for a wide range of tasks including natural language processing.

In some embodiments, the text encoder may concatenate the text paragraph D with previous key-phrases of a paragraph D' that has previously been encoded during a previous iteration of the encoding process so that the text encoder may avoid redundantly selecting the previous key-phrases P' as key-phrases for the text paragraph D. For example, to encode the text paragraph D and previous key-phrases P' of a previous paragraph D', the text encoder may use a sequence $S=[w_1, w_2, \ldots, w_n, SEP, kp_1, kp_2, \ldots, kp_m]$, where SEP is a token used to differentiate two sentences and $kp_i \in P'$ is the i-th key-phrase extracted by key-phrase extraction network 335 for the previous paragraph D'. The text encoder may input the sequence S to a final layer of the text encoder to produce the hidden word representations $H=[h_1, h_2, \ldots, h_n]$. In some embodiments, for words including multiple word pieces, an average of word-piece representation is used to obtain the final vector $h_n$.

At operation 610, the system generates key-phrase data generated based on the hidden word representations. In some cases, the operations of this step may refer to, or may be performed by, a key-phrase extraction network as described with reference to FIGS. 3 and 4. For example, the key-phrase extraction network may generate key-phrase data as described with reference to FIGS. 3-4.

Training

A method for training a machine learning model is described. One or more aspects of the method include receiving training data including a text paragraph ground truth key-phrase data for the text paragraph; generating domain data indicating whether words of the paragraph are relevant to the domain of the text paragraph; generating predicted key-phrase data for the text paragraph using a key-phrase extraction network; and updating parameters of the key-phrase extraction network based on the predicted key-phrase data, the ground truth key-phrase data, and the domain data.

Some examples of the method further include encoding each word of the text paragraph using a text encoder to obtain hidden word representations for the text paragraph, wherein the domain data and the predicted key-phrase data are generated based on the hidden word representations. Some examples of the method further include comparing the predicted key-phrase data and the ground truth key-phrase data. Some examples further include computing a key-phrase loss based on the comparison, wherein the parameters of the key-phrase extraction network are updated based on the key-phrase loss.

Some examples of the method further include determining whether a word of the text paragraph is a repeated word. Some examples further include computing a uniqueness reward based on whether the word is the repeated word, wherein the parameters of the key-phrase extraction network are updated based on the uniqueness reward.

Some examples of the method further include generating domain-specific attention scores for each word of the text paragraph. Some examples further include pruning words from the text paragraph based on the domain-specific attention scores to obtain a filtered paragraph, wherein the domain data is generated based on the filtered paragraph.

Some examples of the method further include computing a bridge loss based on the domain data, wherein the parameters of the key-phrase extraction network are updated based on the domain loss. Some examples of the method further include computing a semantic similarity score for each sentence in the paragraph. Some examples further include determining whether each of the sentences is an informative sentence based on the semantic similarity score. Some examples further include computing an informativeness reward based on the determination, wherein the parameters of the key-phrase extraction network are updated based on the informativeness reward.

Some examples of the method further include computing paragraph-specific domain data for each of a plurality of text paragraphs in a document, wherein the parameters of the key-phrase extraction network are updated based on the paragraph-specific domain data.

Figure 7:
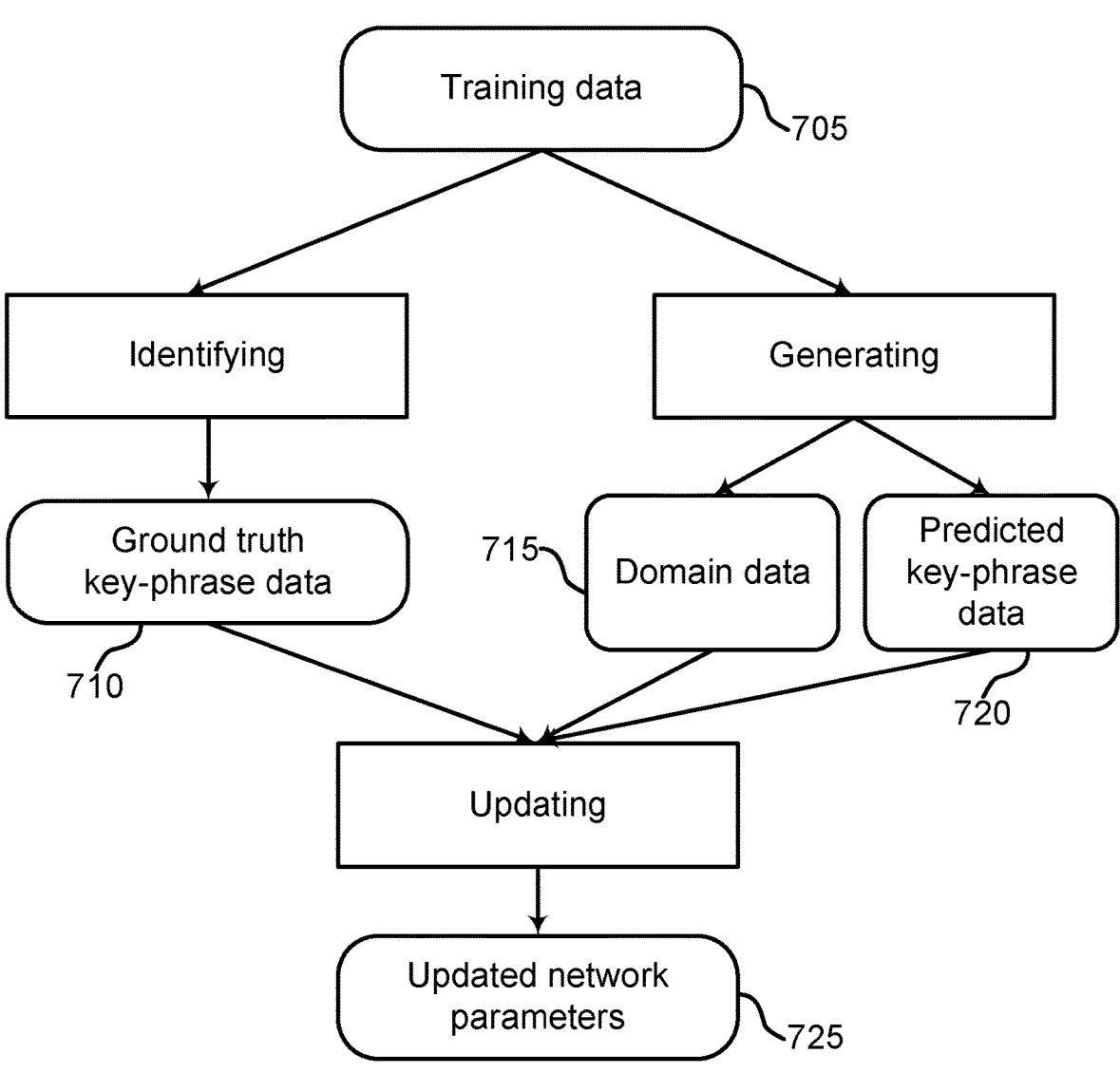
FIG. 7 shows an example of a process for training a machine learning model according to aspects of the present disclosure.

FIG. 7 shows an example of training a machine learning model according to aspects of the present disclosure. The example shown includes training data 705, ground truth key-phrase data 710, domain data 715, predicted key-phrase data 720, and updated network parameters 725. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various sub-steps, or are performed in conjunction with other operations.

Referring to FIG. 7, a training component according to embodiments of the present disclosure receives training data 705. For example, training data 705 may be provided from a database as described with reference to FIG. 1, and from the various components of the machine learning model as described with reference to FIG. 3. The training component identifies ground truth key-phrase data 710 that is included in training data 705.

The training component may provide training data 705 to a domain discriminator network as described with reference to FIG. 3, and the domain discriminator network may generate domain data 715 based on training data 705.

For example, a domain-specific phrase detection process of the domain discriminator network may recognize the phrases $P' \in D$ that are representative of the domain of paragraph D. As there is no labeled data for the domain-specific phrase detection process, an unsupervised learning method may be used. Unsupervised learning is one of three basic machine learning paradigms, alongside supervised learning and reinforcement learning. Unsupervised learning draws inferences from datasets including input data without labeled responses. Unsupervised learning may be used to find hidden patterns or grouping in data. For example, cluster analysis is a form of unsupervised learning. Clusters may be identified using measures of similarity such as Euclidean or probabilistic distance.

The domain discriminator network may be pretrained to automatically construct a labeled dataset for domain-specific phrase detection (e.g., domain data 715). For example, the domain discriminator network may combine all training paragraphs $D_n$ from a transcript domain and $D_m$ from a general domain (e.g., training data 705) to construct a dataset Z. Next, the domain discriminator network may use an encoder (such as a $BERT_{BASE}$ model) to encode a paragraph $\bar{D} \in Z$.

The domain discriminator network may then max-pool hidden representations $\bar{H}=[\bar{h}_1, \bar{h}_2, \ldots, \bar{h}_n]$ obtained from a last layer of the encoder to obtain a vector V:

$$V = \text{mp}(\bar{h}_1, \bar{h}_2, \ldots, \bar{h}_n) \qquad (4)$$

and provide the vector V to a feed-forward layer of the domain discriminator network to predict the domain of $\bar{D}$:

$$P(\cdot \mid \bar{D}, \theta') = \sigma(W_2(W_1 * V + b_1) + b_2) \qquad (5)$$

where mp denotes the max-pool function (a pooling operation that computes a maximum value for portions of a feature map and uses the maximum value to create a down-sampled feature map), $\sigma$ is the sigmoid activation function, $W_1$ and $W_2$ are the weight matrices, $b_1$ and b2 are the biases and $P(\cdot|\bar{D}, \theta')$ is the probability distribution over the two domains (e.g., a transcript domain and general domain) predicted by the domain discriminator network with parameter $\theta'$.

In some examples, the domain discriminator network may prune words from the text paragraph based on the domain-specific attention scores to obtain a filtered paragraph, where the domain data is generated based on the filtered paragraph. For example, the domain discriminator network may generate domain-specific attention scores for each word of the text paragraph.

The domain discriminator network may process all paragraphs $\bar{D} \in Z$ to obtain the domain-specific attention scores $A=[a_1, a_2, \ldots, a_n]$ for all words $w_i \in \bar{D}$. In some embodiments, the domain discriminator network may obtain the domain-specific attention scores from a final layer of an encoder of the domain discriminator network (such as a $BERT_{BASE}$ encoder). For example, the domain discriminator network may use the attention scores A to filter the words of the paragraph $\bar{D} \in Z$. The attention scores A may be sorted in descending order:

$$A' = [a'_i \mid a'_i \in A \; \& \; A'_i \ge A'_j \Rightarrow i \le j] \qquad (6)$$

The domain discriminator network may employ a function g(x) in which index i of $$a'_i$$

is the input and the output is the index j of $a_j$ corresponding to entry $$a'_i, \text{ i.e., } a_j = a'_i.$$

The domain discriminator network may construct an array W' in which entry $$w'_i \in W'$$

is the word $w_j \in \overline{D}$, where $j=g(i)$, i.e., the word corresponding to the i-th entry of sorted attention score A'. Finally, the domain discriminator network may prune all words of paragraph $\overline{D}$ that appear after the index k in W':

$$\hat{D} = \{w_i \mid w \in \overline{D} \ \& \ \text{Index\_of}(w_i, W') < k\} \tag{7}$$

where $\text{Index\_of} (w_i, W')$ is a function that returns the index of $w_i$ in the array W'.

To determine the optimal value for k, the domain discriminator network may use the following criteria:

$$\left| P\left(\cdot \mid \hat{D}, \theta'\right) - P\left(\cdot \mid \overline{D}, \theta'\right) \right| \leq \eta \tag{8}$$

where $P(\cdot \mid \hat{D}, \theta')$ is the domain distribution predicted by the domain discriminator network for the filtered paragraph $\hat{D}$, and $\eta$ is a threshold to be selected based on performance on a development set. Accordingly, words that are likely to be important words that may be selected as key-phrase data are preserved in the filtered paragraph, and unimportant words may be excluded from the filtered paragraph.

The domain discriminator network may provide domain data 715 to the training component. The training component may provide training data 705 to a key-phrase extraction network as described with reference to FIG. 3, and the key-phrase extraction network may generate predicted key-phrase data 720 based on training data 705.

For example, a likelihood of the selection of a word w of phrase P to be selected in a key-phrase may be predicted by the key-phrase extraction network using the hidden representations H. In some embodiments, the key-phrase extraction network may consume a given hidden representation $h_i$ using a two-layer feed-forward network to estimate the likelihood $P(\cdot \mid D, w_i, \theta)$:

$$P(\cdot \mid D, w_i, \theta) = \sigma(W_2(W_1 * h_1 + b_1) + b_2, \theta) \tag{9}$$

where $\sigma$ is the softmax function, $W_2$ and $W_1$ are the weight matrices, $b_1$ and $b_2$ are the biases, and $P(\cdot \mid D, w_i \theta)$ is the label distribution for the word $w_i$ predicted by the key-phrase extraction network 335 with parameters $\theta$. The key-phrase extraction network may provide key-phrase data 720 to the training component.

The training component may update parameters of the key-phrase extraction network based on ground truth key-phrase data 710, domain data 715, and predicted key-phrase data 720. For example, the training component may compute a bridge loss based on domain data 715, where the parameters of the key-phrase extraction network are updated by the training component based on the domain loss. For example, the domain discriminator network may use every word that remains in the filtered paragraph $\hat{D}$ to create data for domain-specific key-phrase detection.

A label vector $L=[l_1, l_2, \ldots, l_n]$ may be constructed by the domain discriminator network as labels for domain-specific key-phrase detection:

$$l_i = \begin{cases} 1, \text{ if } w_i \in \hat{D} \\ 0, \text{ otherwise} \end{cases} \tag{10}$$

The key-phrase extraction network may be trained by the training component using the labels for domain-specific key-phrase detection L to recognize domain-specific key-phrases in a multi-task setting. The domain discriminator network may feed the hidden representations $H=[h_1, h_2, \ldots, h_n]$ obtained from a text encoder as described with reference to FIG. 3 into a feed-forward layer of the domain discriminator network with sigmoid activation function to predict the domain specific key-phrases:

$$Q(\cdot \mid D, w_i, \overline{\theta}) = \sigma(W_2(W_1 * V + b_1) + b_2) \tag{11}$$

where $\sigma$ is the sigmoid activation function, $W_1$ and $W_2$ are weight matrices, $b_1$ and $b_2$ are biases, and $Q(\cdot \mid D, w_i, \overline{\theta})$ is the distribution of labels (i.e., whether domain-specific or not) predicted by the domain discriminator network with parameter $\overline{\theta}$ for an i-th word.

The training component may compute a negative log-likelihood bridge loss:

$$\mathcal{L}_{bridge} = -\sum_{i=1}^{n} \log\left(Q\left(l_i \mid D, w_i, \overline{\theta}\right)\right) \tag{12}$$

In some examples, the training component compares predicted key-phrase data 720 and ground truth key-phrase data 710. In some examples, the training component computes a key-phrase loss based on the comparison, where the parameters of the key-phrase extraction network are updated based on the key-phrase loss. For example, the training component may compute a cross-entropy loss for training the key-phrase extraction network:

$$\mathcal{L}_{kp} = -\sum_{i=1}^{n} \log(P(l_i \mid D, w_i, \theta)) \tag{13}$$

In some examples, the training component computes a uniqueness reward based on whether a word is a repeated word, where the parameters of the key-phrase extraction network are updated based on the uniqueness reward. For example, to train the key-phrase extraction network, the training component may provide a uniqueness reward:

$$R_{rep}(KP) = -\frac{1}{n}\sum_{i=1}^{n} REP(w_i) \tag{14}$$

$$REP(w_i) = \begin{cases} 1, \text{ if } w_i \in P' \text{ and } \text{argmax}(P(\cdot \mid D, w_i, \theta)) \in \{B, I\} \\ 0, \text{ otherwise} \end{cases} \tag{15}$$

where KP is the list of predicted key-phrases and $REP(w_i)$ is a function that returns "1" if a word $w_i$ is predicted to be in a key-phrase and it appears in key-phrases of a previous phrase P'.

In some embodiments, the training component may update parameters of the key-phrase extraction network using data from an information filter network as described with reference to FIG. 3 to avoid extracting key-phrase data from uninformative portions of transcripts.

In some embodiments, the information filter network operates at a sentence level. For example, the information filter network may identify sentences that are likely to be uninformative. To determine which sentences are uninformative, the information filter network may use an unsupervised process based on a semantic representation of sentences of a paragraph D. To determine whether the sentences are uninformative, the information filter network may compute semantic similarities of each of the sentences of the paragraph D and compare the semantic similarities with each other. Sentences that correspond to a semantic similarity that is beneath a predetermined threshold are identified as uninformative.

For example, given a paragraph D encoded by the text encoder as a hidden representation vector H, the information filter network may use a [CLS] vector representation (a classification token) obtained from the final layer of the text encoder as a document level representation, i.e., $h_p$. The information filter network may compute a hidden representation $h_{S,i}$ of a sentence $S_i \in D$ by max-pooling over word vector representations:

$$h_{S,i} = mp(\{h_k \mid w_k \in S_i\}) \qquad (1)$$

Using the paragraph representation $h_p$ and a sentence representation $h_{s,i}$, the information filter network may compute an information score for every sentence $S_i$:

$$\alpha_i = \sigma(h_p) \odot \sigma(h_{S,i}) \qquad (2)$$

where $\sigma$ is the softmax operation and $\odot$ is the Hadamard product. The information filter network may then identify uninformative sentences based on their information scores $\alpha_i$:

$$\text{Is\_Uninformative}(S_i) = f(x) = \begin{cases} 1, & \text{if } \alpha_i \leq \beta \\ 0, & \text{otherwise} \end{cases} \qquad (3)$$

where $\beta$ is a trade-off parameter to be selected based on the performance on the development set.

In some examples, the training component computes an informativeness reward based on determining whether each of the sentences is an informative sentence based on the semantic similarity score, where the parameters of the key-phrase extraction network are updated based on the informativeness reward. For example, using identified uninformative sentences, the training component provides the informativeness reward:

$$R_{uninformative}(KP) = -\sum_{i=1} \text{Is\_Uninformative}(\text{Sent}(kp_i)) \qquad (16)$$

where $kp_i \in KP$ is the i-th key-phrase selected by the information filter network as described with reference to FIG. 3 and $\text{Sent}(kp_i)$ is a function that returns a sentence containing key-phrase $kp_i$.

In some examples, the training component updates parameters of the key-phrase extraction network based on the key-phrase extraction loss $\mathcal{L}_{kp}$, the bridge loss $\mathcal{L}_{bridge}$, the uniqueness reward $R_{rep}$ (KP) and/or the informativeness reward $R_{uninformative}$(KP).

For example, the training component may use a reinforcement algorithm to compute gradients of the rewards. Reinforcement learning is one of three basic machine learning paradigms, alongside supervised learning and unsupervised learning. Specifically, reinforcement learning relates to how software agents make decisions in order to maximize a reward. The decision making model may be referred to as a policy. This type of learning differs from supervised learning in that labelled training data is not needed, and errors need not be explicitly corrected. Instead, reinforcement learning balances exploration of unknown options and exploitation of existing knowledge. In some cases, the reinforcement learning environment is stated in the form of a Markov decision process (MDP). Furthermore, many reinforcement learning algorithms utilize dynamic programming techniques. However, one difference between reinforcement learning and other dynamic programming methods is that reinforcement learning does not require an exact mathematical model of the MDP. Therefore, reinforcement learning models may be used for large MDPs where exact methods are impractical.

The training component may compute an overall reward:

$$R(KP) = R_{rep}(KP) + \alpha R_{uninformative}(KP) \qquad (17)$$

where $\alpha$ is a trade-off hyperparameter. The training component may then minimize negative expected reward R(KP) over the possible choices of KP:

$$\mathcal{L}_R = -\mathbb{E}_{\hat{K}P \sim P(\hat{K}P|D)}[R(\hat{K}P)] \qquad (18)$$

The training component may then estimate a policy gradient:

$$\nabla \mathcal{L}_R = -\mathbb{E}_{\hat{K}P \sim P(\hat{K}P|D)}[(R(\hat{K}P) - b)\nabla \log P(\hat{K}P \mid D)] \qquad (19)$$

The training component may then estimate policy gradient $\nabla \mathcal{L}_R$ using one roll-out sample via the predicted key-phrases KP:

$$\nabla \mathcal{L}_R = -(R(KP) - b)\nabla \log P(\hat{K}P \mid D) \qquad (20)$$

where b is the baseline to reduce variance.

The training component may obtain b according to:

$$b = \frac{1}{|B|} \sum_{i=1}^{|B|} R(KP_i) \qquad (21)$$

where |B| is the min-batch size and $KP_i$ is the predicted key-phrases for the i-th sample in the min-batch.

FIG. 8 shows an example of training a neural network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various sub-steps, or are performed in conjunction with other operations.

At operation 805, the system receives training data including a text paragraph ground truth key-phrase data for the text paragraph. In some cases, the operations of this step refer to, or may be performed by, a training component as described with reference to FIG. 3. For example, the training component may receive training data as described with reference to FIG. 7.

At operation 810, the system generates domain data indicating whether words of the paragraph are relevant to the domain of the text paragraph. In some cases, the operations of this step refer to, or may be performed by, a domain discriminator network as described with reference to FIG. 3. For example, the domain discriminator network may generate domain data as described with reference to FIG. 7.

At operation 815, the system generates predicted key-phrase data for the text paragraph using a key-phrase extraction network. In some cases, the operations of this step refer to, or may be performed by, a key-phrase extraction network as described with reference to FIGS. 3 and 4. For example, the key-phrase extraction network may generate predicted key-phrase data as described with reference to FIG. 7.

At operation 820, the system updates parameters of the key-phrase extraction network based on the predicted key-phrase data, the ground truth key-phrase data, and the domain data. In some cases, the operations of this step refer to, or may be performed by, a training component as described with reference to FIG. 3. For example, the training component may update parameters of the key-phrase extraction network as described with reference to FIG. 7.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EE-PROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infra-red, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

receiving a transcript of audio data, wherein the transcript includes a key phrase and an uninformative sentence that is semantically dissimilar to the key phrase;

generating key-phrase data indicating the key phrase using a key-phrase extraction network comprising parameters stored in a non-transitory computer readable medium and that is trained by iteratively updating the parameters using reinforcement learning, wherein the key-phrase extraction network is trained to identify domain-relevant key-phrase data based on transcript domain data obtained using a domain discriminator network, wherein the key-phrase extraction network is trained to determine the key phrase and the uninformative sentence based on an informativeness reward, and wherein the key-phrase extraction network is trained to determine the key phrase using a uniqueness reward computed by predicting a first predicted key phrase and a second predicted key phrase and determining whether a word is included in both the first predicted key phrase and the second predicted key phrase; and generating meta-data for the transcript of the audio data based on the key-phrase data, wherein the meta-data indicates the key phrase and excludes the uninformative sentence.

2. The method of claim 1, further comprising:

receiving the audio data; and converting the audio data to text to obtain the transcript.

3. The method of claim 2, further comprising:

identifying a key-phrase associated with a time of the audio data; and generating an indication that the time is associated with the key-phrase.

4. The method of claim 1, further comprising:

encoding each word of the transcript using a text encoder to obtain hidden word representations for the transcript, wherein the key-phrase data is generated based on the hidden word representations.

5. The method of claim 1, wherein:

the key-phrase extraction network is trained to select informative key-phrase words.

6. An apparatus comprising:

at least one processor;

at least one memory;

a text encoder comprising parameters stored in the at least one memory and configured to encode words of a transcript of audio data to obtain hidden word representations for the transcript, wherein the transcript includes a key phrase and an uninformative sentence that is semantically dissimilar to the key phrase; and a key-phrase extraction network comprising parameters stored in the at least one memory that is trained by iteratively updating the parameters using reinforcement learning and configured to generate key-phrase data indicating the key phrase based on the hidden word representations, wherein the key-phrase extraction network is trained to identify domain-relevant key-phrase data based on transcript domain data obtained using a domain discriminator network, wherein the key-phrase extraction network is trained to determine the key phrase and the uninformative sentence based on an informativeness reward, and wherein the key-phrase extraction network is trained to determine the key phrase using a uniqueness reward computed by predicting a first predicted key phrase and a second predicted key phrase and determining whether a word is included in both the first predicted key phrase and the second predicted key phrase.

7. The apparatus of claim 6, further comprising:

the domain discriminator network, configured to generate the transcript domain data.

8. The apparatus of claim 6, further comprising:

a transcription component configured to transcribe audio data to obtain the transcript.

9. The apparatus of claim 6, wherein:

the text encoder comprises a neural network with a transformer architecture.

10. The apparatus of claim 6, wherein:

the key-phrase extraction network comprises a neural network having a feed-forward architecture.

11. A non-transitory computer readable medium storing code, the code comprising instructions that, when executed by at least one processor, causes the at least one processor to perform operations comprising:

receiving a transcript of audio data, wherein the transcript includes a key phrase and an uninformative sentence that is semantically dissimilar to the key phrase;

generating key-phrase data indicating the key phrase using a key-phrase extraction network comprising parameters stored in a non-transitory computer readable medium and that is trained by iteratively updating the parameters using reinforcement learning, wherein the key-phrase extraction network is trained to identify domain-relevant key-phrase data based on transcript domain data obtained using a domain discriminator network, wherein the key-phrase extraction network is trained to determine the key phrase and the uninformative sentence based on an informativeness reward, and wherein the key-phrase extraction network is trained to determine the key phrase using a uniqueness reward computed by predicting a first predicted key phrase and a second predicted key phrase and determining whether a word is included in both the first predicted key phrase and the second predicted key phrase; and generating meta-data for the transcript of the audio data based on the key-phrase data, wherein the meta-data indicates the key phrase and excludes the uninformative sentence.

12. The non-transitory computer readable medium of claim 11, wherein the instructions further causes the at least one processor to perform operations comprising:

receiving the audio data; and converting the audio data to text to obtain the transcript.

13. The non-transitory computer readable medium of claim 12, wherein the instructions further causes the at least one processor to perform operations comprising:

identifying a key-phrase associated with a time of the audio data; and generating an indication that the time is associated with the key-phrase.

14. The non-transitory computer readable medium of claim 11, wherein the instructions further causes the at least one processor to perform operations comprising:

encoding each word of the transcript using a text encoder to obtain hidden word representations for the transcript, wherein the key-phrase data is generated based on the hidden word representations.

15. The non-transitory computer readable medium of claim 11, wherein:

the key-phrase extraction network is trained to select informative key-phrase words.

* * * * *